United States Patent [19]

Taylor et al.

[11] 3,869,456

[45] Mar. 4, 1975

[54] SYNTHESIS OF 5-PYRIMIDINECARBINOLS

[75] Inventors: Harold M. Taylor; James D. Davenport, both of Indianapolis; Ronald E. Hackler, Greenfield, all of Ind.

[73] Assignee: Eli Lilly and Company, Indianapolis, Ind.

[22] Filed: Dec. 13, 1973

[21] Appl. No.: 424,537

Related U.S. Application Data

[63] Continuation-in-part of Ser. No. 234,339, March 13, 1972, which is a continuation-in-part of Ser. No. 888,949, Dec. 29, 1969, abandoned, which is a continuation-in-part of Ser. No. 829,844, May 7, 1969, abandoned, which is a continuation-in-part of Ser. No. 685,315, Nov. 24, 1967, abandoned, which is a continuation-in-part of Ser. No. 634,074, April 27, 1967, abandoned.

[52] U.S. Cl........ 260/251, 260/240 A, 260/256.4 R, 260/256.5, 260/240 D, 260/240 R, 424/251

[51] Int. Cl. ..................... C07d 51/18, C07d 51/36

[58] Field of Search........ 260/240 R, 240 D, 240 A, 260/251 R, 256.4 R, 256.5

[56] References Cited
UNITED STATES PATENTS 3,657,229   4/1972   Bailey .......................... 260/239 BC

OTHER PUBLICATIONS

Acta Chem. Scand., 19, 1741–1748, (1965), by Gronowitz.

*Primary Examiner*—Elbert L. Roberts
*Attorney, Agent, or Firm*—Dwight E. Morrison; Everet F. Smith

[57] ABSTRACT

There is disclosed an improved method of synthesizing 5-pyrimidinecarbinols by the addition of an alkyllithium to a mixture of 5-halopyrimidine and a ketone at a low temperature. The product compounds are useful as plant fungicides and as plant growth regulators.

5 Claims, No Drawings

SYNTHESIS OF 5-PYRIMIDINECARBINOLS

CROSS-REFERENCE

This application is a continuation-in-part of our copending application Ser. No. 234,339, filed Mar. 13, 1972, which is a continuation-in-part of our then copending application Ser. No. 888,949, filed Dec. 29, 1969, now abandoned, which was a continuation-in-part of our then copending application Ser. No. 829,844, filed May 7, 1969, now abandoned, which was a continuation-in-part of our then copending application Ser. No. 685,315, filed Nov. 24, 1967, now abandoned, which was a continuation-in-part of our then copending application Ser. No. 634,074, filed Apr. 27, 1967, and now abandoned.

BACKGROUND OF THE INVENTION

Because of the utility shown by a series of 5-pyrimidinecarbinols as plant fungicides and plant growth regulators, methods for synthesizing the compounds in good yield have been sought.

In the prior art, Langley, *J. Am. Chem. Soc.*, 78, 2136 (1955), reported on the preparation of 2,4-diethoxy-6-pyrimidyllithium, its use to prepare 2,4-diethoxy-6-pyrimidylcarbinols, and their conversion by successive oxidation and hydrolysis into 6-acyluracils.

Ulbricht, *Tetrahedron*, 6, 225 (1959), reported on the use of a pyrimidinelithium intermediate in the synthesis of 5-ethyluracil.

Also in the prior art, Rajkumar et al., *J. Med. Chem.*, 6, 550 (1963), reported on the synthesis of a series of 5-substituted pyrimidines through the halogen-lithium exchange reaction. A number of 2,4-diethoxy-5-arylhydroxymethylpyrimidines were prepared which were oxidized and hydrolyzed to 5-acyluracils.

Caton et al., *J. Chem. Soc.* 5467 (1965), reported on the reaction of pyrimidin-5-yllithium compounds with carbon dioxide, dimethylformamide, and sulfur.

Gronowitz et al., *Acta Chem. Scand.*, 19, 1741–1748 (1965), reported that 5-bromopyrimidine underwent halogen-metal exchange with butyllithium at −105°C. to yield 5-pyrimidyllithium, which, upon treatment with carbon dioxide, produced 5-pyrimidinecarboxylic acid in good yield.

More recently, Mulvey et al., *J. Hetero. Chem.*, 10, 79 (1973), reported on the preparation of 5-substituted uracils, which preparation proceeded inter alia via pyrimidinelithium intermediates.

All of these references teach the preparation of the lithio derivative of the pyrimidine first, and then the addition of the carbonyl reactant to the lithio-pyrimidine to produce the pyrimidine derivative desired.

SUMMARY

There has now been discovered an improvement in the method for the synthesis of 5-pyrimidinecarbinols, which improvement comprises addition of an alkyllithium to a mixture of 5-bromopyrimidine and a ketone at a low temperature. By this reverse addition, a higher yield of the desired 5-pyrimidinecarbinol is obtained.

DESCRIPTION OF THE PREFERRED EMBODIMENT

This invention relates to an improvement in the method of preparing 5-pyrimidinecarbinols. More particularly, this invention relates to an improvement in the method for preparing 5-pyrimindinecarbinols of the formula

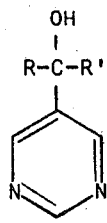

wherein R is
C$_1$-C$_{13}$ alkyl,
C$_2$-C$_{12}$ alkenyl,

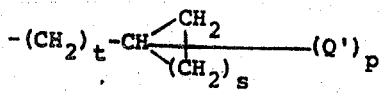

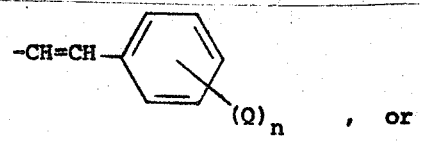

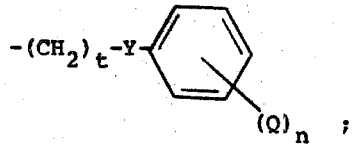

R' is
C$_2$-C$_{13}$ alkyl,
C$_2$-C$_{12}$ alkenyl,
norbornen-2-yl,
2-norbornyl,
adamantyl,
3-pyridyl,

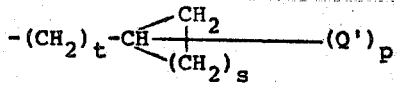

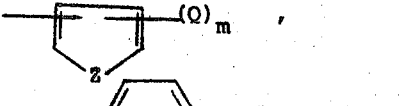

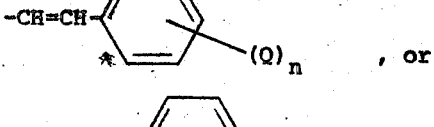

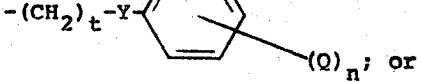

R and R', taken together with the carbon atom to which they are attached, form a ring of the formula

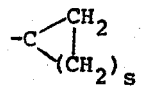

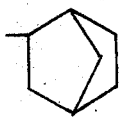

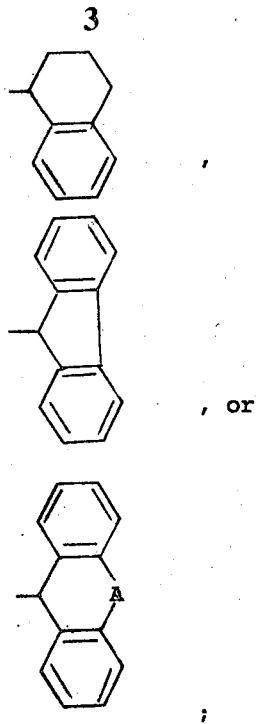

wherein
Q is $C_1$-$C_4$ alkyl, $C_1$-$C_8$ alkoxy, $C_1$-$C_4$ alkylthio, halo, hydroxy, trifluoromethyl, $C_1$-$C_4$ alkylsulfonyl, nitro, or di($C_1$-$C_4$ alkyl)amino, or two Q's attached to adjacent carbon atoms of a benzene ring form a methylenedioxy group;

Q' is $C_1$-$C_4$ alkyl or methoxy;
Y is oxygen, sulfur, or a carbon-to-carbon bond;
Z is oxygen or sulfur;
A is oxygen, sulfur, $CH_2$, $CH_2$—$CH_2$, or $CH=CH$;
$n$ is 0 to 5;
$m$ is 0 to 2;
$p$ is 0 to 3;
$s$ is 1 to 6; and
$t$ is 0 to 5, by the halogen-metal interchange between an alkyllithium and a 5-halopyrimidine followed by reaction of the intermediate 5-pyrimidyllithium with a ketone of the formula

wherein R and R' have the same significance as set forth hereinabove, all steps of the reaction being run at low temperatures.

The various alkyl groups are saturated straight or branched-chain aliphatic hydrocarbon radicals such as, for example, methyl, ethyl, n-propyl, isopropyl, n-butyl, sec.-butyl, t-butyl, n-amyl, isoamyl, sec.-amyl, t-amyl and other isomeric amyl, n-hexyl, isohexyl, sec.-hexyl and other isomeric hexyl, n-heptyl, and other isomeric heptyls, n-octyl, isooctyl, and other isomeric octyls, n-nonyl, nonyl-2, nonyl-3, nonyl-4, 2-methyloctyl-2,4-ethylheptyl-4, 3-methyl-4-ethylhexyl-4, 3-methyl-3-ethylpentyl-3, 2-ethyl-hexyl-1, n-decyl, decyl-4, 3-ethyloctyl-3, undecyl, n-dodecyl, n-tridecyl, and the like.

Illustrative alkoxy groups are methoxy, ethoxy, propoxy, isopropoxy, n-butoxy, and isobutoxy.

Illustrative alkylthio groups are methylthio, ethylthio, n-propylthio, isopropylthio, and n-butylthio.

Halo includes bromo, chloro, fluoro and iodo.

Each of R and R' may be cycloalkyl groups containing from three to eight carbon atoms, optionally substituted with from one to three $C_1$-$C_4$ alkyl or methoxy groups. These groups can be attached directly to the α-carbon atom of the pyrimidinemethane or may be attached through from one to five methylene groups.

Each of R and R' may also be phenyl or substituted phenyl attached directly to the α-carbon or through one to five methylene groups. They may also be styryl or substituted styryl. In addition, one of them may be pyridyl, furyl, substituted furyl, thienyl, or substituted thienyl.

Suitable $C_2$-$C_6$ alkenyl groups include vinyl, allyl, propenyl, 1-butenyl, 2-methyl-2-butenyl, 1-pentenyl, 3-methyl-1-pentenyl, 2-pentenyl, 3-pentenyl, 1-hexenyl, 2-hexenyl, or 3-hexenyl, and the like.

Compounds regarded as coming within the scope of the above generic formula, and prepared by the instant improved method of synthesis, include, but are not limited to, the following:

α,α-Dicycloheptyl-5-pyrimidinemethanol
α,α-Bis(2,4-dichlorophenyl)-5-pyrimidinemethanol
α,α-Bis(2,5-xylyl)-5-pyrimidinemethanol
α-(4-Chlorophenyl)-α-(2-methoxyphenyl)-5-pyrimidinemethanol
α-(3-Chlorophenyl)-α-(2-methoxyphenyl)-5-pyrimidinemethanol
α-Cyclopentyl-α-phenyl-5-pyrimidinemethanol
α-(4-Chlorophenyl)-α-(3-pyridyl)-5-pyrimidinemethanol
α-(4-Ethylphenyl)-α-(4-fluorophenyl)-5-pyrimidinemethanol
α,α-Bis(4-cumenyl)-5-pyrimidinemethanol
α,α-Bis(2-methylpentyl)-5-pyrimidinemethanol
α-(2-Chlorophenyl)-α-(n-heptyl)-5-pyrimidinemethanol
α-t-Butyl-α-(3-fluorophenyl)-5-pyrimidinemethanol
α,α-Bis(n-decyl)-5-pyrimidinemethanol
α-(4-Chlorophenyl)-α-(4-ethoxyphenyl)-5-pyrimidinemethanol
α-(p-Cumenyl)-α-(2,4-Dichlorophenyl)-5-pyrimidinemethanol
α-Cycloheptyl-α-phenyl-5-pyrimidinemethanol
α-(3,4-Dichlorophenyl)-α-undecyl-5-pyrimidinemethanol
α-(2,4-Dimethylphenyl)-α-n-octyl-5-pyrimidinemethanol
α-(2,4-Difluorophenyl)-α-n-hexyl-5-pyrimidinemethanol
α-Cycloheptyl-α-(pentafluorophenyl)-5-pyrimidinemethanol
α-Ethyl-α-(n-undecyl)-5-pyrimidinemethanol
α-Isobutyl-α-phenyl-5-pyrimidinemethanol
α-(p-Cumenyl)-α-(α,α,α-trifluoro-m-tolyl)-5-pyrimidinemethanol
α-(2,4-Difluorophenyl)-α-phenyl-5-pyrimidinemethanol
α,α-Bis(n-octyl)-5-pyrimidinemethanol, and the like.

The pyrimidinecarbinols prepared according to the improved process of the present invention have been found capable of controlling fungi which attack food crops, ornamental plants, and turf. This utility is taught and claimed in Belgian Pat. No. 714,003 (Oct. 22, 1968). The compounds have been found useful in combatting both air-borne and soil-borne fungi which affect plants. Most unexpectedly and surprisingly, these pyrimidinecarbinol compounds are systemically active as fungicidal agents. That is, the pyrimidinecarbinol compounds are absorbed by the plant and transported throughout the plant via the vascular system of the plant. Further, the use of these pyrimidinecarbinols causes plants to produce, in a manner as yet unknown or understood, fungicidal substances of an unknown structure, which substances can be extracted from the plant tissues by methods known to the art and shown to possess fungicidal activity in standard fungicidal tests.

The compounds prepared according to the present invention have been shown by suitable in vitro and in vivo tests to be fungicidal and to control such fungi as *Erysiphe polygoni*, the causative organism of cucumber anthracnose; *Uromyces phaseoli*, the causative organism of bean rust; *Piricularis oryzae*, the causative organism of rice blast; and *Rhizoctonia solani*, the causative organism of damping off in cotton.

In addition, certain fungi which affect ornamental plants, including *Sphaerotheca pannosa* var. rosae, the causative organism of powdery mildew of rose, and *Erysiphe graminis*, the causative organism of powdery mildew of turf, are controlled by the pyrimidinecarbinols prepared according to this invention.

The compounds prepared according to this invention are also active against certain turf pathogens which yearly inflict great damage to turf. These turf pathogens include *Helminthosporium sativum*, the causative organism of leaf spot; *Rhizoctonia solani*, the causative organism of brown patch; *Sclerotinia homoeocarpa*, the causative organism of dollar spot; *Fusarium roseum*, the causative organism of root rot; and *Pythium* sp., the causative organism of pythium blight.

The systemic antifungal action of these pyrimidinecarbinols has been demonstrated by the following remarkable experiment: Seeds of cucumbers, for example, are soaked for a short period of time, about 10 minutes, in an ethanol-light isoparaffin oil solution of 5-substituted pyrimidine. The seeds are removed, dried, and planted, and produce plants free from powdery mildew and protected therefrom.

Many of the pyrimidinecarbinols prepared according to this invention and useful as plant fungicides also show growth regulator activity. The use of the pyrimidines as growth regulators is the subject of our copending U.S. application Ser. No. 234,338, filed Mar. 13, 1972.

In the prior art, as set forth hereinabove, it is well known to synthesize 5-substituted pyrimidines by allowing a 5-halopyrimidine to undergo halogen-metal exchange with a suitable alkyllithium to yield 5-pyrimidyllithium, which lithiopyrimidine is then allowed to react with a ketone, carbon dioxide, or other reactant suitable to the scheme of synthesis being undertaken. The art teaches the reaction is to be run at a low temperature to minimize side reactions. The prior art references teach the preparation of the 5-pyrimidyllithium first, after which the lithiopyrimidine and the other reactant are commingled. The teaching of the prior art is thus different from the procedure disclosed and claimed herein.

A low temperature is likewise important in the improvement in synthesis of 5-pyrimidinecarbinols taught and claimed herein. Thus, while some product can be obtained when the reaction is carried out at a temperature as high as −10°C., better yields are obtained at reaction temperatures resulting from using solid carbon dioxide or liquid nitrogen to cool the reaction mixture. Thus, while fair yields are obtainable at temperatures of about −65° to −70°C., or as low as about −125°C., the best yields are obtained at temperatures in the range of about −80° to −100°C.

The yield at the lower temperatures also appears to be dependent to a large degree on the solubility of the ketone, that is, the carbonyl reactant, in the solvent at that temperature. Thus, highly symmetrical ketones, such as 4,4'-dichlorobenzophenone, which are not very soluble even at room temperature in the ether-tetrahydrofuran solvent, give very poor yields.

The rate of addition of the alkyllithium to the solution or suspension of the ketone and the 5-halopyrimidine is also of importance in maintaining the suitably low reaction temperature and thereby in obtaining a good yield of desired product. Thus, the addition of the alkyllithium, for optimum results, is carried out dropwise when the reaction is being run in the laboratory, or, when run on a larger scale, the rate is adjusted so as to keep the temperature of the reaction mixture at below −70°C.

The claimed improvement in the synthesis of 5-pyrimidinecarbinols therefore involves, as set forth above, the slow addition of the alkyllithium to the mixture of the 5-halopyrimidine and the carbonyl reactant at a low temperature of from about −70° to about −125°C., suitably from about −80° to about −120°C., and preferably from about −80° to about −100°C. The low temperature is maintained by external cooling and by addition of the alkyllithium at such a rate as to assist in maintaining the temperature at below about −70°C. Such addition rate is suitably dropwise or such similar rate as keeps the reaction temperature from rising above −70°C.

The change in order of mixing the reactants, while deceptively simple, results in greatly improved yields of the desired 5-pyrimidinecarbinols.

This change in the method, that is, time and place of preparation of the 5-lithiopyrimidine intermediate, is very important. The change in method amounts, in effect, to an in situ preparation of the 5-lithiopyrimidine, and, the carbonyl reactant being already present, permits immediate reaction to occur between the newly-formed 5-lithiopyrimidine and the carbonyl reactant. The slow addition of the alkyllithium limits the amount of that reactant present at any one moment of time, thereby decreasing the amount of reaction possible between the alkyllithium and the carbonyl reactant. It also helps limit the amount of reaction occurring between the lithiopyrimidine formed and the bromopyrimidine reactant. The number of undesired by-products is decreased through reduction of the unwanted side reactions.

The change in order of combining reactants in the preparation of the 5-pyrimidinecarbinols, coupled with carrying out the reaction at the temperature of solid Dry-Ice or liquid nitrogen, reduces side reactions and the production of unwanted by-products. The desired 5-pyrimidinecarbinols are thereby obtained in much improved yields.

Thus, the improvement in the synthesis of 5-pyrimidinecarbinols comprises commingling the 5-halopyrimidine, preferably 5-bromopyrimidine, and the carbonyl compound, for example benzoylcyclohexane, in a suitable solvent and cooling the mixture to a temperature of about −80° to about −120°C., suitably about −80° to about −100°C., and adding an alkyllithium, such as n-butyllithium, to the mixture. While the reaction can be conducted either with or without an atmosphere of dry nitrogen in the reaction vessel, the presence of dry nitrogen does prevent the reaction of the alkyllithium with oxygen and carbon dioxide, and therefore, an atmosphere of dry nitrogen is preferred. Suitable solvents include anhydrous diethyl ether, anhydrous tetrahydrofuran, or a mixture thereof, suitably 1:1 by volume of diethyl ether and tetrahydrofuran. The 5-halopyrimidine used in the reaction can be 5-bromopyrimidine or 5-iodopyrimidine, preferably the 5-bromopyrimidine, which is readily prepared by the method of Bredereck et al., *Chem. Ber.*, 91, 2832 (1958). The alkyllithium used in the reaction can be methyllithium, ethyllithium, n-propyllithium, or n-butyllithium. The last, n-butyllithium, is preferred because it is commercially available suspended in n-hexane, and can be used directly.

After the addition of the alkyllithium, the reaction mixture is stirred overnight in the cold. The reaction product mixture is then washed successively with dilute aqueous ammonium chloride solution and water, and the organic layer separated and dried over a suitable drying agent, such as anhydrous magnesium sulfate, or the like. The dried organic layer is concentrated to dryness in vacuo and the solid residue extracted with ether to remove undesired by-products. The ether-insoluble material remaining is identified by elemental analysis as α-cyclohexyl-α-phenyl-5-pyrimidinemethanol.

The ketones used in the syntheses are either commercially available or are readily prepared by methods already in the literature and known to those skilled in the art.

The following examples set forth in greater detail the improvement in the synthesis of the compounds.

EXAMPLE 1

α-Cyclohexyl-α-phenyl-5-pyrimidinemethanol

To a solution of 0.1 mole of benzoylcyclohexane in 250 ml. of a mixture of equal volumes of tetrahydrofuran and ether maintained in an atmosphere of dry nitrogen, and cooled to about −120°C. was added a solution of 0.1 mole of 5-bromopyrimidine in the same mixed solvent. The mixture of the benzoylcyclohexane and 5-bromopyrimidine in tetrahydrofuranether was stirred and maintained at about −120°C. in a cooling bath composed of liquid nitrogen and ethanol, and to the thus cooled mixture was added 60 ml. of a 15 percent solution of n-butyllithium in n-hexane, and the reaction mixture was stirred overnight.

The reaction product mixture was washed successively with 10 percent aqueous ammonium chloride solution and water and dried over anhydrous potassium carbonate. The dried organic solution was evaporated to dryness to yield a solid weighing about 14 g. The solid was extracted with ether and the undissolved solid washed twice with ether. The ether-insoluble material was identified as α-cyclohexyl-α-phenyl-5-pyrimidinemethanol having a melting point of about 156°–157°C.

EXAMPLE 2

α,α-Diphenyl-5-pyrimidinemethanol

To a mixture of 35.2 g. (0.22 mole) of 5-bromopyrimidine and 39.6 g. (0.22 mole) of benzophenone in 300 ml. of dry tetrahydrofuran cooled to a temperature of −80°C. was added dropwise with stirring 100 ml. of a 15 percent solution of butyllithium in hexane. Stirring was continued for about 1.5 hours and the reaction product mixture allowed to warm to room temperature.

The reaction product mixture was worked up by washing it successively with saturated aqueous ammonium chloride solution and water and the organic layer separated. The organic layer was washed two times with 100-ml. portions of water and evaporated to dryness. The oily residue was dissolved in ether, and on standing, a product precipitated which had a melting point of about 167°–170°C. and weighed about 20 g. The product was identified as α,α-diphenyl-5-pyrimidinemethanol.

Following the general procedures of Example 1 and Example 2, with appropriate starting materials, the following compounds were prepared and isolated as free bases or acid addition salts thereof:

α,α-Bis(4-chlorophenyl)-5-pyrimidinemethanol. Melting point: Glass.

α-Phenyl-α-(4-chlorophenyl)-5-pyrimidinemethanol hydrochloride. Melting point: Glass.

α,α-Bis(cyclohexyl)-5-pyrimidinemethanol. Melting point: 142°–144°C.

α,α-Bis(n-hexyl)-5-pyrimidinemethanol. Melting point: Viscous liquid.

α-Methyl-α-phenyl-5-pyrimidinemethanol. Melting point: 70°C.

α,α-Bis(3-fluorophenyl)-5-pyrimidinemethanol. Melting point: Glass.

α-(2-Chlorophenyl)-α-(3-chlorophenyl)-5-pyrimidinemethanol. Melting point: Glass.

α-(2-Chlorophenyl)-α-(4-fluorophenyl)-5-pyrimidinemethanol. Melting point: 66°C.

α-(2-Chlorophenyl)-α-cyclohexyl-5-pyrimidinemethanol. Melting point: 65°C.

α-(2-Chlorophenyl)-α-phenyl-5-pyrimidinemethanol. Melting point: 154°–156°C.

α-(n-Pentyl)-α-phenyl-5-pyrimidinemethanol. Melting point: Liquid.

α-(2-Fluorophenyl)-α-phenyl-5-pyrimidinemethanol. Melting point: 139°–141°C.

α,α-Bis(3,4-dichlorophenyl)-5-pyrimidinemethanol hemietherate. Melting point: 88°–89°C.

α-(Phenyl)-α-(2-thienyl)-5-pyrimidinemethanol. Melting point: 140°–142°C.

α,α-Bis(isopropyl)-5-pyrimidinemethanol. Melting point: 115°–118°C.

α-(4-Ethoxyphenyl)-α-isopropyl-5-pyrimidinemethanol. Melting point: 89°C.

α-Cyclopropyl-α-(4-methoxyphenyl)-5-pyrimidinemethanol. Melting point: 111°C.

α-(4-Chlorophenyl)-α-isopropyl-5-pyrimidinemethanol. Melting point: 129°C.

α-(t-Butyl)-α-(4-methoxyphenyl)-5-pyrimidinemethanol. Melting point: 117°C.

α-(p-Cumenyl)-α-isopropyl-5-pyrimidinemethanol. Melting point: 98°C.

α-(2,3-Dichlorophenyl)-α-isopropyl-5-pyrimidinemethanol. Melting point: 127°C.

α-Cyclohexyl-α-cyclopropyl-5-pyrimidinemethanol. Melting point: 113°-114°C.

α-(3-Chlorophenyl)-α-isopropyl-5-pyrimidinemethanol. Melting point: 95°C.

α-(2-Chlorophenyl)-α-(3-pyridyl)-5-pyrimidinemethanol. Melting point: 129°C.

α-(p-Cumenyl)-α-cyclopropyl-5-pyrimidinemethanol. Melting point: 104°C.

α-Cyclohexyl-α-isopropyl-5-pyrimidinemethanol. Melting point: Oil.

α,α-Bis(n-nonyl)-5-pyrimidinemethanol. Melting point: Oil.

α-Cyclohexyl-α-(2,5-dichlorophenyl)-5-pyrimidinemethanol. Melting point: 136°C.

α-(2-Chlorophenyl)-α-(4-methoxyphenyl)-5-pyrimidinemethanol. Melting point: Glass.

α-Cyclohexyl-α-(2-methoxyphenyl)-5-pyrimidinemethanol. Melting point: 114°-115°C.

α-Cyclohexyl-α-(2-fluorophenyl)-5-pyrimidinemethanol. Melting point: 140°-142°C.

α-Cyclohexyl-α-pentafluorophenyl-5-pyrimidinemethanol. Melting point: 149°-150°C.

α,α-Bis(2-chlorophenyl)-5-pyrimidinemethanol. Melting point: 132°-133°C.

α-Isopropyl-α-(α,α,α-trifluoro-m-tolyl)-5-pyrimidinemethanol. Melting point: 97°C.

α-Isopropyl-α-(α,α,α-trifluoro-p-tolyl)-5-pyrimidinemethanol. Melting point: 113°C.

α-Isopropyl-α-(4-propoxyphenyl)-5-pyrimidinemethanol. Melting point: 80°C.

α-Cyclopropyl-α-(p-tolyl)-5-pyrimidinemethanol. Melting point: 128°C.

α-(4-Bromophenyl)-α-cyclopropyl-5-pyrimidinemethanol. Melting point: 123°C.

α-(2-Fluorophenyl)-α-(4-fluorophenyl)-5-pyrimidinemethanol. Melting point: 130°C.

α-(t-Butyl)-α-(p-tolyl)-5-pyrimidinemethanol. Melting point: 155°C.

α-Cyclopropyl-α-(4-fluorophenyl)-5-pyrimidinemethanol. Melting point: 73°-74°C.

α-Isopropyl-α-(4-methoxyphenyl)-3-pyrimidinemethanol. Melting point: 148°C.

α-(4-Chlorophenyl)-α-cyclopropyl-5-pyrimidinemethanol. Melting point: 112°-113°C.

α-(4-Methoxyphenyl)-α-phenyl-5-pyrimidinemethanol. Melting point: 95°-97°C.

α-(2,4-Difluorophenyl)-α-phenyl-5-pyrimidinemethanol. Melting point: 120°-121°C.

α-(2,5-Dichlorophenyl)-α-phenyl-5-pyrimidinemethanol. Melting point: 134°-136°C.

α-Cyclobutyl-α-phenyl-5-pyrimidinemethanol. Melting point: 115°-117°C.

α-(3,4-Dichlorophenyl)-α-phenyl-5-pyrimidinemethanol. Melting point: Glass.

α-(2,4-Dichlorophenyl)-α-phenyl-5-pyrimidinemethanol. Melting point: 96°-97°C.

α-(4-Nitrophenyl)-α-phenyl-5-pyrimidinemethanol. Melting point: Glass.

α-(2-Fluorophenyl)-α-(3-fluorophenyl)-5-pyrimidinemethanol. Melting point: 104°-108°C.

α,α-Bis(p-tolyl)-5-pyrimidinemethanol. Melting point: Glass.

α-(2,4-Dimethylphenyl)-α-phenyl-5-pyrimidinemethanol. Melting point: Glass.

α,α-Bis(4-methylstyryl)-5-pyrimidinemethanol. Melting point: 159°-160°C.

α-(4-Chlorophenyl)-α-(4-phenoxy-n-butyl)-5-pyrimidinemethanol. Melting point: Viscous oil. Identified by NMR spectrum and elemental analyses.

α-(5-Norbornen-2-yl)-α-phenyl-5-pyrimidinemethanol. Melting point: 137°C.

α,α-Bis[2-(4-methylcyclohexyl)ethyl]-5-pyrimidinemethanol. Melting point: Viscous oil. Identified by NMR spectrum and elemental analyses.

α-Phenyl-α-(3-phenyl-n-propyl)-5-pyrimidinemethanol. Melting point: Viscous oil. Identified by NMR spectrum and elemental analyses.

α-(2-Norbornyl)-α-(4-phenoxybutyl)-5-pyrimidinemethanol. Melting point: 132°C.

α-(4-Chlorophenyl)-α-(2-norbornyl)-5-pyrimidinemethanol. Melting point: 193°C.

α-(Pentenyl)-α-phenyl-5-pyrimidinemethanol. Melting point: Viscous oil. Identified by NMR spectrum.

α-(3-Pentenyl)-α-phenyl-5-pyrimidinemethanol. Melting point: Glass. Identified by NMR spectrum.

α-Phenyl-α-(4-trifluoromethylphenyl)-5-pyrimidinemethanol. Melting point: 125°-127°C.

α-Cyclobutyl-α-(4-methoxyphenyl)-5-pyrimidinemethanol. Melting point: 148°C.

1-(5-Pyrimidinyl)cyclopentadecan-1-ol. Melting point: 62°-63°C.

1-(5-pyrimidinyl)-1-tetralol. Melting point: 153°-154°C.

α-(2-Chlorophenyl)-α-(4-chlorophenyl)-5-pyrimidinemethanol. Melting point: Amorphous. Identified by NMR spectrum.

α-Cyclohexyl-α-isopropyl-5-pyrimidinemethanol. Identified by NMR spectra.

αCyclopentyl-α-(2,4-dichlorophenyl)-5-pyrimidinemethanol. Melting point: 141°-143°C. Identified by elemantal analyses and NMR spectra.

α-Cyclopentyl-α-(2-fluorophenyl)-5-pyrimidinemethanol. Melting point: 93°-94°C. Identified by elemental analyses and NMR spectrum.

α-(2,4-Dichlorophenyl)-α-pentyl-5-pyrimidinemethanol. Identified by NMR spectrum.

α-Cyclobutyl-α-(2,4-dichlorophenyl)-5-pyrimidinemethanol. Melting point: 170°-172°C. Identified by elemental analyses and NMR spectrum.

α-Cyclobutyl-α-(2-fluorophenyl)-5-pyrimidinemethanol. Melting point: 119°-120°C. Identified by elemental analyses and NMR spectrum.

α-Cyclohexyl-α-(2-fluorophenyl)-5-pyrimidinemethanol. Melting point: 142°-143°C. Identified by NMR spectrum.

α-Isopropyl-α-(p-tolyl)-5-pyrimidinemethanol. Melting point: 107°-108°C.

α-Isopropyl-α-(m-tolyl)-5-pyrimidinemethanol. Melting point: 108°C.

α-Isopropyl-α-(o-tolyl)-5-pyrimidinemethanol. Melting point: 131°C.

α-Methyl-α-(p-tolyl)-5-pyrimidinemethanol. Melting point: Oil.

α-(4-Chlorophenyl)-α-(2-fluorophenyl)-5-pyrimidinemethanol. Melting point: 81°–82°C.

α-(t-Butyl)-α-(m-chlorophenyl)-5-pyrimidinemethanol. Melting point: 141°C.

α-Cyclohexyl-α-(2,4-dichlorophenyl)-5-pyrimidinemethanol. Melting point: Solid. Identified by NMR spectrum.

α-Isopropyl-α-(2-thienyl)-5-pyrimidinemethanol. Identified by elemental analyses and NMR spectrum.

α,α-Bis(n-octyl)-5-pyrimidinemethanol. Melting point: 135°–136°C. Identified by NMR and infrared spectra.

α-Cyclopentyl-α-(4-methoxyphenyl)-5-pyrimidinemethanol. Melting point: 135°C. Identified by elemental analyses and NMR spectrum.

α-Cyclohexyl-α-(2-cyclohexyl-n-propyl)-5-pyrimidinemethanol. Melting point: 99°C. Identified by elemental analyses and NMR spectrum.

α-(2-Chloro-4-methoxyphenyl)-α-phenyl-5-pyrimidinemethanol. Melting point: 95°–97°C. Identified by elemental analyses and NMR spectrum.

α-(4-Chloro-2-methoxyphenyl)-α-phenyl-5-pyrimidinemethanol. Melting point: 85°–87°C. Identified by elemental analyses and NMR spectrum.

α-Cyclohexyl-α-(2-cyclohexylethyl)-5-pyrimidinemethanol. Melting point: 117°–119°C. Identified by elemental analyses and NMR spectrum.

α-(2-Cyclohexylethyl)-α-cyclohexylmethyl-5-pyrimidinemethanol. Melting point: Oil. Identified by NMR spectrum.

α-Cyclohexyl-α-(m-tolyl)-5-pyrimidinemethanol. Melting point: 130°C. Identified by elemental analyses and NMR spectrum.

α-Cyclohexyl-α-(2,5-dimethylcyclohexyl)-5-pyrimidinemethanol. Melting point: 139°–140°C. Identified by NMR spectrum.

α-(n-Butyl)-α-(4-methoxyphenyl)-5-pyrimidinemethanol. Identified by elemental analyses and NMR spectrum.

α,α-Dicycloheptyl-5-pyrimidinemethanol. Melting point: 53°–55°C. Identified by elemental analyses and NMR spectrum.

α-Cyclopropyl-α-(2-thienyl)-5-pyrimidinemethanol. Melting point: Oil. Identified by elemental analyses and NMR spectrum.

α-Cyclohexyl-α-(4-methoxyphenyl)-5-pyrimidinemethanol. Melting point: 137°–138°C. Identified by elemental analyses and NMR spectrum.

α,α-Bis(2-thienyl)-5-pyrimidinemethanol. Melting point: 70°C. Identified by NMR spectrum.

α-Cyclohexyl-α-(4-phenoxy-n-butyl)-5-pyrimidinemethanol. Melting point: 95°–96°C. Identified by elemental analyses and NMR spectrum.

α,α-Bis(n-pentyl)-5-pyrimidinemethanol. Identified by NMR spectrum.

α-(n-Butyl)-α-ethyl-5-pyrimidinemethanol. Identified by elemental analyses and NMR spectrum.

α-Cyclopentyl-α-cyclopropyl-5-pyrimidinemethanol. Melting point: 92°C. Identified by elemental analyses and NMR spectrum.

α-Neopentyl-α-phenyl-5-pyrimidinemethanol. Melting point: 106°C. Identified by elemental analyses and NMR spectrum.

α-Cyclohexylmethyl-α-methyl-5-pyrimidinemethanol. Melting point: 75°C. Identified by elemental analyses and NMR spectrum.

α-(4-Dimethylaminophenyl)-α-phenyl-5-pyrimidinemethanol. Melting point: 64°C. Identified by elemental analyses and NMR spectrum.

α-(3,5-Dichlorophenyl)-α-phenyl-5-pyrimidinemethanol. Melting point: 136°–137°C. Identified by NMR spectrum.

α-(2-Chlorophenyl)-α-(n-hexyl)-5-pyrimidinemethanol. Melting point: Oil. Identified by elemental analyses and NMR spectrum.

α-(3-Chlorophenyl)-α-phenyl-5-pyrimidinemethanol. Melting point: 154°C. Identified by NMR spectrum.

α,α-Bis(3-chlorophenyl)-5-pyrimidinemethanol. Melting point: Glass. Identified by elemental analyses and NMR spectrum.

α,α-Di(m-tolyl)-5-pyrimidinemethanol hemietherate. Melting point: 49°–53°C. Identified by NMR spectrum.

α-(3-Chlorophenyl)-α-cyclohexyl-5-pyrimidinemethanol. Melting point: 59°C. Identified by elemental analyses and NMR spectrum.

α-Cyclooctyl-α-(4-methoxyphenyl)-5-pyrimidinemethanol. Melting point: 120°C. Identified by elemental analyses and NMR spectrum.

α,α-Diethyl-5-pyrimidinemethanol. Identified by NMR spectrum.

α,α-Diphenyl-5-pyrimidinemethanol. Melting point: 167°–170°C. Identified by elemental analyses and NMR spectrum.

α,α-Bis(3-methoxyphenyl)-5-pyrimidinemethanol. Melting point: 72°–74°C. Identified by microanalyses and NMR spectrum.

α,α-Dicyclopropyl-5-pyrimidinemethanol. Melting point: 55°–56°C. Identified by elemental analyses and NMR spectrum.

α-(3-Chlorophenyl)-α-(4-methoxyphenyl)-5-pyrimidinemethanol. Melting point: 115°–117°C. Identified by elemental analyses and NMR spectrum.

α,α-Diisobutyl-5-pyrimidinemethanol. Identified by elemental analyses and NMR spectrum.

α-Cyclopentyl-α-phenyl-5-pyrimidinemethanol. Melting point: 104°C. Identified by elemental analyses and NMR spectrum.

α-Isopropyl-α-phenyl-5-pyrimidinemethanol. Melting point: 135°c. Identified by elemental analyses and NMR spectrum.

α,α-Dicyclopentyl-5-pyrimidinemethanol. Melting point: 119°–120°C. Identified by elemental analyses and NMR spectrum.

α-(4-Chlorophenyl)-α-(4-methoxyphenyl)-5-pyrimidinemethanol. Melting point: Glass. Identified by NMR spectrum.

α-Cyclopropyl-α-phenyl-5-pyrimidinemethanol. Melting point: 64°–65°C. Identified by elemental analyses and NMR spectrum.

α-Cyclohexyl-α-(o-tolyl)-5-pyrimidinemethanol. Melting point: 149°C. Identified by elemental analyses and NMR spectrum.

α-(4-Fluorophenyl)-α-phenyl-5-pyrimidinemethanol. Melting point: 112°–115°C. Identified by elemental analyses and NMR spectrum.

α-[4-(t-Butyl)phenyl]-α-cyclopropyl-5-pyrimidinemethanol. Melting point: 132°–133°C. Identified by elemental analyses and NMR spectrum.

α-Cyclohexyl-α-(3-phenylpropyl)-5-pyrimidinemethanol. Melting point: 82°C. Identified by elemental analyses and NMR spectrum.

α-Cyclopentyl-α-(3,5-dimethoxyphenyl)-5-pyrimidinemethanol. Melting point: 117°C. Identified by elemental analyses and NMR spectrum.

α-Cyclohexyl-α-(3,4-dimethylcyclohexyl)-5-pyrimidinemethanol. Melting point: 45°C. Identified by elemental analyses and NMR spectrum.

α-Cyclohexyl-α-(3,4-dimethoxyphenyl)-5-pyrimidinemethanol. Melting point: 172°C. Identified by elemental analyses and NMR spectrum.

α-Cyclopropyl-α-(3,4-xylyl)-5-pyrimidinemethanol. Melting point: 109°–110°C. Identified by elemental analyses and NMR spectrum.

α-Cyclohexyl-α-(p-tolyl)-5-pyrimidinemethanol. Melting point: 140°C. Identified by elemental analyses and NMR spectrum.

α-(4-Methoxyphenyl)-α-(n-pentyl)-5-pyrimidinemethanol. Identified by NMR spectrum.

α-Cyclopropyl-α-(2,5-xylyl)-5-pyrimidinemethanol. Melting point: 192°C. Identified by elemental analyses and NMR spectrum.

α-(3-Methoxyphenyl)-α-methyl-5-pyrimidinemethanol. Identified by elemental analyses and NMR spectrum.

α-Cyclohexyl-α-(4-phenoxyphenyl)-5-pyrimidinemethanol. Melting point: 130°C. Identified by elemental analyses and NMR spectrum.

α-Cyclophentyl-α-cyclopentylmethyl-5-pyrimidinemethanol. Melting point: 144°–147°C. Identified by elemental analyses and NMR spectrum.

α,α-Bis(cyclopentylmethyl)-5-pyrimidinemethanol. Melting point: 80°–82°C. Identified by elemental analyses and NMR spectrum.

α-(p-Bromophenyl)-α-isopropyl-5-pyrimidinemethanol. Melting point: 123°C. Identified by elemental analyses and NMR spectrum.

α-(p-Cyclopropylphenyl)-α-isopropyl-5-pyrimidinemethanol. Melting point: Oil. Identified by NMR spectrum.

α-(p-Fluoro-α-methylbenzyl)-α-isopropyl-5-pyrimidinemethanol. Melting point: 179°C. Identified by elemental analyses and NMR spectrum.

α-(p-Fluorophenyl)-α-(m-methoxyphenyl)-5-pyrimidinemethanol. Melting point: 64°–66°C. Identified by NMR spectrum.

α-(t-Butyl)-α-(p-propoxyphenyl)-5-pyrimidinemethanol. Melting point: 98°C. Identified by elemental analyses and NMR spectrum.

α-Cyclohexyl-α-(2,4-dichlorophenyl)-5-pyrimidinemethanol. Melting point: 131°–132°C. Identified by elemental analyses and NMR spectrum.

α-(2,4-Dimethoxyphenyl)-α-isopropyl-5-pyrimidinemethanol. Melting point: 117°–118°C. Identified by NMR spectrum.

α-(2-Furyl)-α-isopropyl-5-pyrimidinemethanol. Melting point: 91°C. Identified by elemental analyses and NMR spectrum.

α-(4-Chlorobenzyl)-α-isopropyl-5-pyrimidinemethanol. Melting point: 128°C. Identified by NMR spectrum.

α-(5-Bromo-2-methoxyphenyl)-α-isopropyl-5-pyrimidinemethanol. Melting point: 163°C. Identified by elemental analyses and NMR spectrum.

α-Isopropyl-α-(p-methoxyphenethyl)-5-pyrimidinemethanol. Melting point: 101°–103°C. Identified by elemental analyses and NMR spectrum.

α-(p-Hydroxyphenyl)-α-isopropyl-5-pyrimidinemethanol. Melting point: Glass. Identified by elemental analyses and NMR spectrum.

α-(p-Methoxyphenyl)-α-methyl-5-pyrimidinemethanol. Melting point: 103°C. Identified by NMR spectrum.

α-(o-Ethoxyphenyl)-α-isopropyl-5-pyrimidinemethanol. Melting point: 128–129°C. Identified by elemental analyses and NMR spectrum.

α-Cyclohexyl-α-(o-ethoxyphenyl)-5-pyrimidinemethanol. Melting point: 108°C. Identified by elemental analyses and NMR spectrum.

α-(p-Chlorophenyl)-α-(m-methoxyphenyl)-5-pyrimidinemethanol. Melting point: 109°–110°C. Identified by elemental analyses and NMR spectrum.

α-(3-Furyl)-α-isopropyl-5-pyrimidinemethanol. Melting point: 85°C. Identified by elemental analyses and NMR spectrum.

α-Cyclohexyl-α-(pentafluorophenyl)-5-pyrimidinemethanol. Melting point: 149°–150°C. Identified by elemental analyses and NMR spectrum.

α-Cyclohexyl-α-propyl-5-pyrimidinemethanol. Melting point: Oil. Identified by elemental analyses and NMR spectrum.

α-(3-Fluorophenyl)-α-(4-fluorophenyl)-5-pyrimidinemethanol. Melting point: 137°C. Identified by elemental analyses and NMR spectrum.

α,α-Bis(4-fluorophenyl)-5-pyrimidinemethanol. Melting point: 112°C. Identified by elemental analyses and NMR spectrum.

α-(3-Fluorophenyl)-α-phenyl-5-pyrimidinemethanol. Melting point: 151°C. Identified by elemental analyses and NMR spectrum.

α-(2-Cyclopentylethyl)-α-(4-methoxyphenyl)-5-pyrimidinemethanol. Melting point: Oil. Identified by elemental analyses and NMR spectrum.

α-Cyclohexyl-α-cyclohexylmethyl-5-pyrimidinemethanol. Melting point: 133°–134°C. Identified by NMR spectrum.

α-t-Butyl-α-(p-fluorophenyl)-5-pyrimidinemethanol. Melting point: 114°–115°C.

α-(5,6-Dibromo-2-norbornyl)-α-phenyl-5-pyrimidinemethanol. Melting point: 80°C.

α-Isopropyl-α-(4-methyl-2-thienyl)-5-pyrimidinemethanol. Melting point: 129.5°C. Identified by elemental analyses and NMR spectrum.

α-(4-Methoxyphenyl)-α-(n-propyl)-5-pyrimidinemethanol. Melting point: Oil. Identified by elemental analyses and NMR spectrum.

α-(Isopropyl)-α-(2-methoxyphenyl)-5-pyrimidinemethanol. Melting point: 126°–127°C. Identified by elemental analyses and NMR spectrum.

α-Cyclopropyl-α-(2-methoxyphenyl)-5-pyrimidinemethanol. Melting point: 143°–144°C. Identified by elemental analyses and NMR spectrum.

α-(p-Cumenyl)-α-methyl-5-pyrimidinemethanol. Melting point: 101°–102°C. Identified by NMR spectrum.

α-(4-Ethylphenyl)-α-isopropyl-5-pyrimidinemethanol. Identified by NMR spectrum.

α-Isobutyl-α-(4-methoxyphenyl)-5-pyrimidinemethanol. Melting point: 77°C. Identified by NMR spectrum and elemental analyses.

α-(2,4-Dimethoxyphenyl)-α-ethyl-5-pyrimidinemethanol. Melting point: 99°C. Identified by elemental analyses and NMR spectrum.

α-Cyclobutyl-α-(4-isopropylphenyl)-5-pyrimidinemethanol. Melting point: 101°–103°C. Identified by elemental analyses and NMR spectrum.

α-Isopropyl-α-(4-pentyloxyphenyl)-5-pyrimidinemethanol. Melting point: 102°C. Identified by elemental analyses and NMR spectrum.

α-(1-Ethylbutyl)-α-(4-methoxyphenyl)-5-pyrimidinemethanol. Identified by NMR spectrum.

α-(3-Chlorophenyl)-α-(4-chlorophenyl)-5-pyrimidinemethanol. Melting point: Glass. Identified by NMR spectrum.

α-Cyclobutyl-α-(4-fluorophenyl)-5-pyrimidinemethanol. Melting point: 149°C. Identified by elemental analyses and NMR spectrum.

α-Phenyl-α-(2,5-xylyl)-5-pyrimidinemethanol. Melting point: 56°C. Identified by elemental analyses and NMR spectrum.

α-Phenyl-α-(3,4-xylyl)-5-pyrimidinemethanol. Melting point: 75°C. Identified by elemental analyses and NMR spectrum.

α-(3,4-Dimethoxyphenyl)-α-isopropyl-5-pyrimidinemethanol. Melting point: 140°C. Identified by NMR spectrum.

α-Isopropyl-α-(3,4-xylyl)-5-pyrimidinemethanol. Melting point: 134°C. Identified by NMR spectrum.

α-Isopropyl-α-(4-octyloxyphenyl)-5-pyrimidinemethanol. Melting point: Oil. Identified by NMR spectrum.

α-Cyclopentyl-α-(m-tolyl)-5-pyrimidinemethanol. Melting point: Oil. Identified by NMR spectrum and elemental analyses.

α-(4-Fluorophenyl)-α-isopropyl-5-pyrimidinemethanol. Melting point: 137°C. Identified by elemental analyses and NMR spectrum.

α-(3-Chlorophenyl)-α-(2-fluorophenyl)-5-pyrimidinemethanol. Melting point: 97°–99°C. Identified by NMR spectrum.

α-(4-Chlorophenyl)-α-(4-fluorophenyl)-5-pyrimidinemethanol. Melting point: 47°–55°C. Identified by NMR spectrum.

α-Cyclophenyl-α-(4-methoxycyclohexyl)-5-pyrimidinemethanol. Melting point: Oil. Identified by NMR spectrum.

α-(4-Chlorophenyl)-α-(2-fluorophenyl)-5-pyrimidinemethanol. Melting point: 81°–82°C. Identified by NMR spectrum.

α-(4-Chlorophenyl)-α-(3-fluorophenyl)-5-pyrimidinemethanol. Melting point: 94°–96°C. Identified by NMR spectrum.

α-Cyclopentyl-α-isopropyl-5-pyrimidinemethanol. Melting point: 93°–94°C. Identified by NMR spectrum.

α-Hexyl-α-isopropyl-5-pyrimidinemethanol. Melting point: Oil. Identified by elemental analyses and NMR spectrum.

α-(2-Chlorophenyl)-α-(3-fluorophenyl)-5-pyrimidinemethanol. Melting point: 102°–103°C. Identified by NMR spectrum.

α-(3-Chlorophenyl)-α-(3-fluorophenyl)-5-pyrimidinemethanol. Melting point: 76°–80°C. Identified by NMR spectrum.

α-(3-Chlorophenyl)-α-(4-fluorophenyl)-5-pyrimidinemethanol. Melting point: 105°–106°C. Identified by NMR spectrum.

α-(4-Methoxyphenyl)-α-(2-methylpropenyl)-5-pyrimidinemethanol. Melting point: Oil. Identified by elemental analyses and NMR spectrum.

α-Isobutyl-α-(4-methoxycyclohexyl)-5-pyrimidinemethanol. Melting point: Oil. Identified by elemental analyses and NMR spectrum.

α-(1-Ethylpropyl)-4-(4-methoxyphenyl)-5-pyrimidinemethanol. Melting point: 128°C. Identified by elemental analyses and NMR spectrum.

α-Isopropyl-α-(2-norbornyl)-5-pyrimidinemethanol. Melting point: 160°C. Identified by elemental analyses and NMR spectrum.

α-Cyclohexyl-α-(p-propoxyphenyl)-5-pyrimidinemethanol. Melting point: 120°C. Identified by NMR spectrum and elemental analyses.

α-Cyclobutyl-α-(p-propoxyphenyl)-5-pyrimidinemethanol. Melting point: 83°–84°C. Identified by elemental analyses and NMR spectrum.

The preparation on a large scale of two of the 5-pyrimidinemethanols according to the novel improved process is illustrated by the following examples:

EXAMPLE 3

α-(2,4-Dichlorophenyl)-α-phenyl-5-pyrimidinemethanol

The starting ketone for use in preparing the subject compound of this Example 3 was synthesized according to the following procedure, which is well known in the art.

In a 22-liter, three neck, round-bottom flask equipped with a mechanical stirrer, reflux condenser, dropping funnel, protected from moisture with drying tubes and provided with a heating mantle, there was placed 8 liters of dry benzene and 1528 g. of granular aluminum chloride. This mixture was heated to a temperature of about 50°C. and there was added slowly a previously prepared solution of 2000 g. of 2,4-dichlorobenzoyl chloride in 4 liters of dry benzene. The addition required about 3 hours and the temperature of the mixture was controlled at about 50°–55°C. Evolution of HCl hsd occurred during the addition. When the addition was complete, the reaction mixture was heated slowly to reflux temperature, which is about 78°–81°C. The reaction mixture was refluxed for about 3 hours, and was then allowed to stir and cool overnight.

In a 100-liter, glass-lined, portable reaction pot equipped with an air stirrer, there was placed about 10–15 liters of ice and water and 500 ml. of concentrated hydrochloric acid. The temperature of the mixture was about 0°–10°C. The reaction product mixture was poured into the ice water-hydrochloric acid mixture, the temperature being held at 0°–10°C. by adding ice. The lower aqueous layer was separated and extracted once with about 3 liters of benzene. The benzene extract was combined with the original organic layer and the combined organic layers washed 3 times with 5-liter portions of water or until the washings were neutral to pH paper. The benzene layer was then dried over anhydrous sodium sulfate. The drying agent was filtered off and the benzene solution concentrated in vacuo. The concentration was completed by holding the pot at about 100°C. under vacuum for about 6 hours to remove low-boiling impurities. The residue was then distilled in vacuo to obtain product having a boiling point of about 160°C. at .08 mm. Hg. The product weighed 2125 g., and was identified as 2,4-dichlorobenzophenone.

A 22-liter, three-necked, round bottom flask was set up and equipped with a stirrer, low-temperature thermometer, 2-liter dropping funnel and a nitrogen purge line. The flask was surrounded by a large insulated container which contained methyl cyclopentane as a solvent for the cooling bath. There were two stirrers in the cooling bath and the methyl cyclopentane solvent was cooled by liquid nitrogen passed through a coil inserted in the bath. Butyllithium for the reaction was supplied from a cylinder elevated higher than the 2-liter dropping funnel through which the butyllithium was to be added to the 22-liter flask. A nitrogen cylinder was available for applying pressure on the butyllithium cylinder. The dropping funnel and the 22-liter flask were flushed with nitrogen before the start of the reaction.

To the 22-liter flask was added 954 g. (6 moles) of 5-bromopyrimidine, 1494 g. (6moles) of 2,4-dichlorobenzophenone (prepared above), 5760 ml. of anhydrous tetrahydrofuran, and 1920 ml. of anhydrous ether. The mixture was maintained in a nitrogen atmosphere throughout the reaction period. The mixture was cooled to about −100°C. using a combination of Dry Ice and liquid nitrogen. While the temperature in the reaction flask was maintained at about −90° to −105°C., butyllithium, 4355 ml. of a 15.13 percent solution in hexane, was added through the dropping funnel over a period of about 4 hours. During that addition, and particularly after about 3600 ml. of the butyllithium in hexane solution had been added, material in the flask began to thicken and turned dark around the edges. At this point, the rate of agitation was increased and the rate of addition was decreased. After the addition was complete, the reaction product mixture was stirred for about 1 hour at a temperature of about −90° to −95°C. The cooling bath was removed and the reaction product mixture was allowed to stir another hour at a temperature of about −70° to −80°C.

The reaction product mixture was worked up by adding thereto a previously mixed solution of 480 g. of ammonium chloride in 1800 ml. of water. This mixture was poured into the reaction product mixture slowly and the temperature of the mixture rose to about −30°C. The mixture was allowed to stir for about ½ hour and then allowed to stand overnight.

The temperature rose to about 0°C. The mixture was poured into a 22-liter bottom-outlet flask. At a temperature varying between about 10°C. and room temperature, the lower aqueous layer was separated. The aqueous layer was extracted with about 1 liter of ether and the aqueous layer then discarded. The ether extract was combined with the original organic layer and the combined organic layers washed 4 times with 2-liter portions of water until neutral. The water washings were discarded. The organic layer was dried for about ¾ hour over anhydrous potassium carbonate. The drying agent was filtered off and the organic solution concentrated in a tared 12-liter boiling flask to yield a heavy molasses-like product.

The flask was equipped with a reflux condenser and crude material was dissolved in about 2040 ml. of carbon tetrachloride by heating on a steam bath. The mixture was then cooled to about 25°C., and poured into a 12-liter flask equipped with a thermometer, stirrer, and dropping funnel, and surrounded by an ice bath. There was added through the dropping funnel, with stirring of the mixture, 360 ml. of hexane. The mixture in the flask was seeded with seed crystals and stirred for about 1 hour, or until crystallization was well advanced. There was then added through the dropping funnel dropwise an additional 660 ml. of hexane for a total of about 1020 ml. of hexane. The flask and contents were chilled to about 0° to −5°C. for about 2 hours and then let stand in the chill room overnight. The mixture was filtered and the solid which was collected was washed with a mixture of carbon tetrachloride and hexane (2:1 by volume) in the cold. Three liters of wash solvent was used. The solid material was removed from the Buchner funnel and dried at a temperature of about 50°C. overnight. The material weighed 1221 g., and was identified as α-(2,4-dichlorophenyl)-α-phenyl-5-pyrimidinemethanol.

EXAMPLE 4

α-Cyclopropyl-α-(4-methoxyphenyl)-5-pyrimidinemethanol

The cyclopropyl p-methoxyphenyl ketone used in the preparation of the 5-pyrimidinecarbinol is synthesized according to the following procedure, which is well known to the art.

To a 200-gallon, glass-lined still, there was added 100 liters of benzene and 28 kg. of anhydrous aluminum chloride. This mixture was stirred for about 30 minutes to form a good slurry. To the slurry was added 22 liters of anisole. The still and contents were then cooled to a temperature of about 0° to 2°C., using brine as the cooling agent. The temperature was then held at about 0° to 10°C. and there was added 28.2 kg. of 4-chlorobutyryl chloride over a period of about 50 minutes. After the addition was complete, the mixture was allowed to stir for about 30 minutes.

The reaction product mixture was then transferred from the still into a 500-liter, glass-lined pot equipped with bottom outlet, in which pot was contained 100 liters of ice and cold water which kept the temperature below 25°C. When the transfer was complete the mixture was allowed to stir for about 30 minutes. The material was then placed back into the still and stirred for about 20 minutes. The layers were then allowed to separate. The water layer was separated and the benzene layer was washed twice with about 150 liters of cold water. The water washes were discarded. The benzene layer was dried over anhydrous sodium sulfate for about 4 hours. The sodium sulfate was filtered off and the benzene solution concentrated under vacuum to remove all solvent. The crude product was identified as p-methoxyphenyl-3-chloropropyl ketone, weighing about 42 kg. Volume about 39 liters.

This ketone was taken up in an equal volume of methanol (39 liters) in a flask equipped with a stirrer and surrounded by a water-cooled cooling jacket, and the mixture cooled to about 10° to 15°C. A mixture of 1 liter of methanol and 1 kg. of potassium hydroxide pellets was prepared and added to the methanol solution of the ketone at such a rate that the temperature was held at 10° to 15°C. Addition required 50 minutes. The mixture was allowed to stir for about 15 minutes, at which time the cold water in the cooling jacket was turned off. The mixture was then allowed to stir for a total of about 36 hours. The reaction product mixture was filtered and the solid material on the filter was washed well with methanol. The methanol washings were combined with the original filtrate and the methanol solution concentrated in vacuo up to a pot temperature of about 60°C. The still was then cooled and 100 liters of benzene and 40 liters of water added with good stirring. The layer were allowed to separate, the water layer was separated off and discarded. The water wash was repeated 3 more times, the water layer being discarded each time. The benzene layer was then dried over anhydrous sodium sulfate overnight. The drying agent was filtered off and the benzene solution placed in a still and concentrated in vacuo up to a pot temperature of about 100°C. There was obtained 33.3 kg. of material identified as cyclopropyl p-methoxyphenyl ketone.

To a 22-liter, three-neck, round-bottom flask in a cold bath equipped as set forth in Example 3, supra, was added 7860 ml. of anhydrous tetrahydrofuran, 954 g. (6 moles) of 5-bromopyrimidine, and 1056 g. (6 moles) of cyclopropyl-p-methoxyphenyl ketone. The flask and contents were kept under an atmosphere of dry nitrogen. The mixture was cooled to a temperature of about −90° to −100°C., and at that temperature there was added from a dropping funnel 4373 ml. of a 15.3 percent solution of butyllithium in hexane. The addition required about 7 hours. After completion of the addition of the butyllithium, the reaction product mixture was stirred for about ½ hour. The reaction product mixture was worked up by adding to it a previously prepared solution of 480 g. of ammonium chloride in 1800 ml. of water. The reaction mixture flask was removed from the cooling bath, stirring continued for about ½ hour, and it was then allowed to stand overnight.

The reaction product mixture was poured into a 22-liter, bottom-outlet flask and the aqueous layer separated off and discarded. The organic layer was washed 3 times with 2 liter portions of water. The water washings were discarded and the organic layer was dried over anhydrous sodium sulfate. The drying agent was filtered off and the organic solution was filtered into a tared three-necked, 12-liter flask. The organic solution was concentrated under vacuum to yield a thick heavy syrup, weighing about 1560 g. It was identified as α-cyclopropyl-α-(4-methoxyphenyl)-5-pyrimidinemethanol.

We claim:

1. In the preparation of a 5-pyrimidinecarbinol of the formula

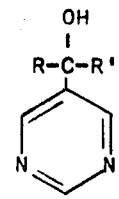

wherein R is
$C_1$-$C_{13}$ alkyl,
$C_2$-$C_{12}$ alkenyl,

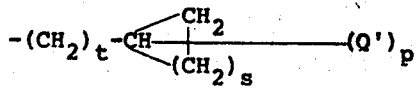

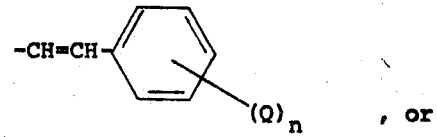

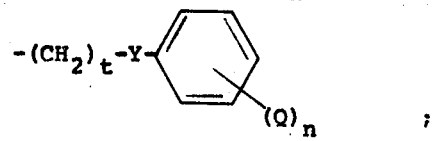

R' is
$C_2$-$C_{13}$ alkyl,
$C_2$-$C_{12}$ alkenyl,
norbornen-2-yl,
2-norbornyl,
adamantyl,
3-pyridyl,

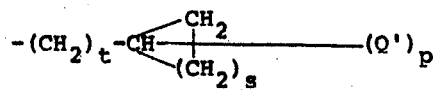

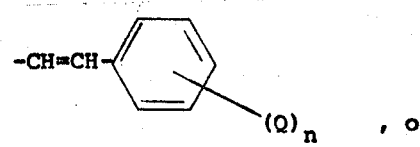

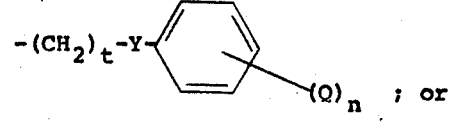

R and R', taken together with the carbon atom to which they are attached, form a ring of the formula

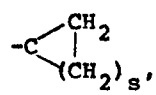

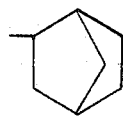,

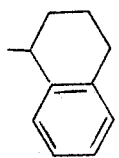,

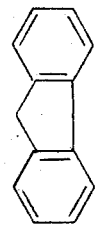, or

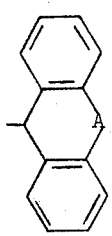;

wherein
Q is $C_1-C_4$ alkyl, $C_1-C_8$ alkoxy, $C_1-C_4$ alkylthio, halo, hydroxy, trifluoromethyl, $C_1-C_4$ alkylsulfonyl, nitro, or di($C_1-C_4$ alkyl)amino, or two Q's attached to adjacent carbon atoms of a benzene ring form a methylenedioxy group;
Q' is $C_1-C_4$ alkyl or methoxy;
Y is oxygen, sulfur, or a carbon-to-carbon bond;
Z is oxygen or sulfur;
A is oxygen, sulfur, $CH_2$, $CH_2-CH_2$, or $CH=CH$;
$n$ is 0 to 5;
$m$ is 0 to 2;
$p$ is 0 to 3;
$s$ is 1 to 6; and
$t$ is 0 to 5,
by the halogen-metal interchange between an alkyllithium and 5-bromopyrimidine followed by reaction of the intermediate 5-pyrimidyllithium with a ketone of the formula

wherein
R and R' have the same significance as hereinabove, the improvement which comprises commingling 5-bromopyrimidine and the ketone at a temperature of from about −70° to about −125°C., and adding thereto an alkyllithium at such a rate that the reaction temperature remains below about −70°C.

2. The process of claim 1 wherein the alkyllithium is n-butyllithium.

3. The process of claim 1 wherein the reaction temperature is maintained at about −80° to about −100°C.

4. The process of claim 1 wherein the 5-bromopyrimidine is commingled with the ketone in a solvent selected from the group consisting of diethyl ether, tetrahydrofuran, and a mixture of diethyl ether and tetrahydrofuran.

5. The process of claim 4 wherein the solvent is a 1:1 mixture by volume of diethyl ether and tetrahydrofuran.

* * * * *

UNITED STATES PATENT OFFICE
CERTIFICATE OF CORRECTION

Patent No. 3,869,456         Dated March 4, 1975

Inventor(s) Harold M. Taylor et al.

It is certified that error appears in the above-identified patent and that said Letters Patent are hereby corrected as shown below:

Column 4, between lines 61 and 62, insert --- α-Cyclobutyl-α-(4-methoxyphenyl)-5-pyrimidinemethanol ---.

Column 9, line 3, "α-(2,3-Dichlorophenyl)-α-isopropyl-5-" should read --- α-(3,4-Dichlorophenyl)-α-isopropyl-5- ---.

Column 10, line 42, "αCyclopentyl" should read --- α-Cyclopentyl ---.

Column 12, line 57, "135°c." should read --- 135°C. ---.

Column 13, line 42, "α-Cyclophentyl" should read --- α-Cyclopentyl ---.

Column 16, line 63, "HCl hsd" should read --- HCl gas ---.

Column 17, line 40, "(6moles)" should read --- (6 moles) ---.

Column 19, line 62, "tared three-necked" should read --- tared, three-necked ---.

Signed and sealed this 1st day of July 1975.

(SEAL)
Attest:

RUTH C. MASON
Attesting Officer

C. MARSHALL DANN
Commissioner of Patents
and Trademarks